[12] United States Patent
Benaiah

(10) Patent No.: US 10,083,463 B2
(45) Date of Patent: Sep. 25, 2018

(54) AUTOMATING VISUAL LITERACY TO PRESENT DATA IN A VISUALLY ORGANIZED FASHION

(71) Applicant: watzan, LLC, New York, NY (US)

(72) Inventor: Charles David Benaiah, New York, NY (US)

(73) Assignee: WATZAN, LLC, New York, NY (US)

( * ) Notice: Subject to any disclaimer, the term of this patent is extended or adjusted under 35 U.S.C. 154(b) by 732 days.

(21) Appl. No.: 14/582,564

(22) Filed: Dec. 24, 2014

(65) Prior Publication Data

US 2015/0186950 A1    Jul. 2, 2015

Related U.S. Application Data

(60) Provisional application No. 61/921,554, filed on Dec. 30, 2013.

(51) Int. Cl.
*G06Q 30/02*    (2012.01)
*G06Q 50/00*    (2012.01)

(52) U.S. Cl.
CPC ..... *G06Q 30/0269* (2013.01); *G06Q 30/0246* (2013.01); *G06Q 50/01* (2013.01)

(58) Field of Classification Search
USPC .......................................................... 705/14
See application file for complete search history.

(56) References Cited

U.S. PATENT DOCUMENTS

| | | | |
|---|---|---|---|
| 9,075,882 B1* | 7/2015 | Ward | G06F 17/30867 |
| 2012/0084170 A1* | 4/2012 | Adair | G06Q 30/08 705/26.3 |
| 2013/0110601 A1* | 5/2013 | Sugiura | G06Q 30/0224 705/14.16 |
| 2016/0140622 A1* | 5/2016 | Wang | G06Q 30/0269 705/14.66 |

* cited by examiner

*Primary Examiner* — Fonya M Long
*Assistant Examiner* — Rodney M Henry
(74) *Attorney, Agent, or Firm* — Holland & Hart LLP

(57) ABSTRACT

A system, an apparatus, a device, a method, and computer readable medium are disclosed. In an example, a server may be configured at least to perform identifying a consumer associated with a device, generating a consumer vector comprising a consumer interest score for each of a plurality of items, generating a second vector, selecting a subset of the plurality of items, and adjusting at least two visual attributes of each item in the subset for display in a graphical user interface based on the consumer vector and the second vector.

20 Claims, 16 Drawing Sheets

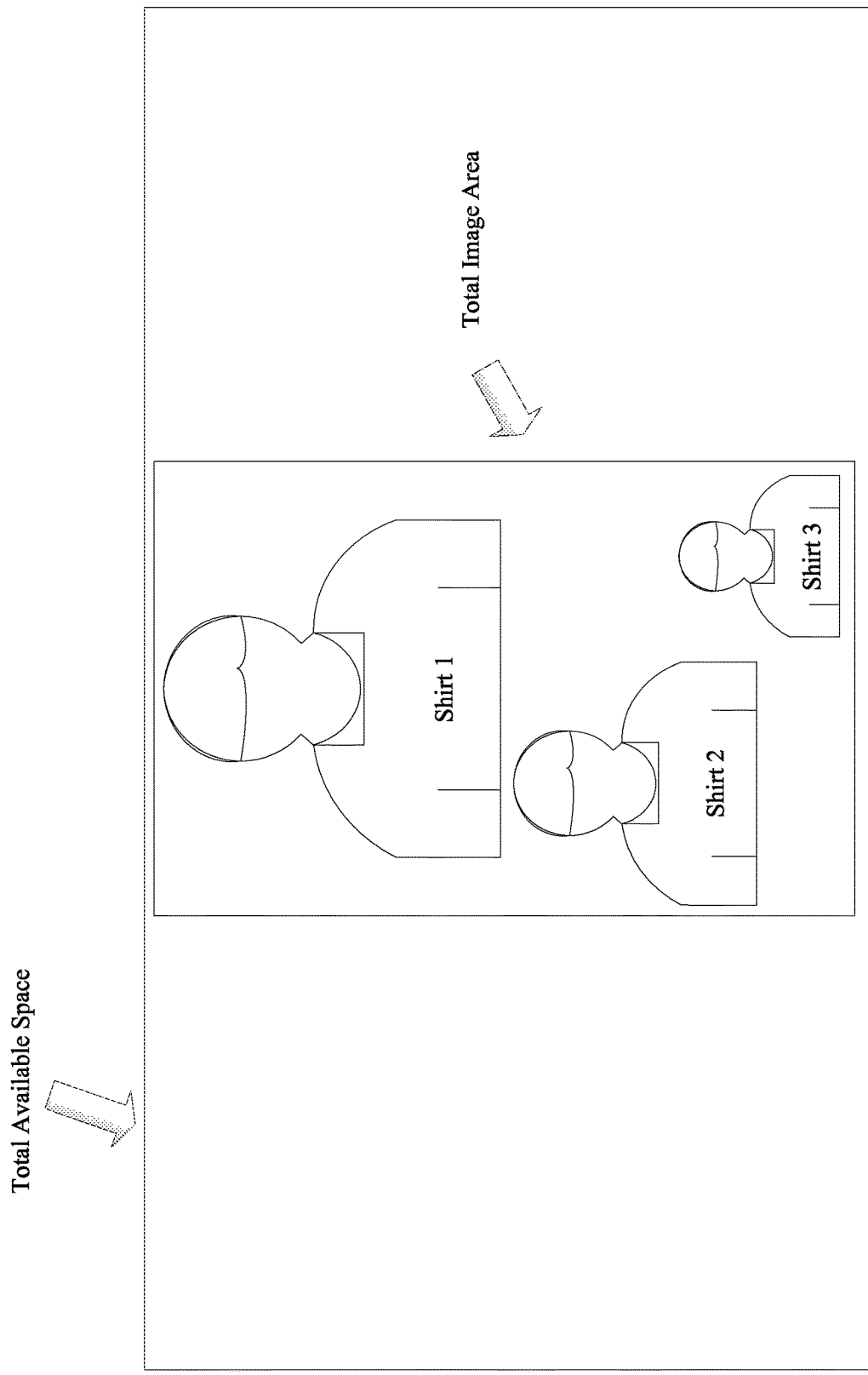

AUTOMATING VISUAL LITERACY TO PRESENT DATA IN A VISUALLY ORGANIZED FASHION

CROSS REFERENCE TO RELATED APPLICATIONS

This applications claims priority to, and the benefit of, U.S. Provisional Pat. App. Ser. No. 61/921,554, titled "Method and Apparatus for Automating Visual Literacy to Present Data in a Visually Organized Fashion," filed Dec. 30, 2013, the entire content of which is incorporated herein by reference.

BACKGROUND

Field of the Invention

The invention relates to systems and methods for visually presenting data. Among other fields and applications, the invention has utility in presenting data in a visually organized fashion.

Description of Related Art

Conventional Web search engines, such as Google, react to a user typing (or verbally inputting) a series of words. Search engines use an algorithm to process the terms and present a list of results in an order based on rankings and criteria known only to the search engine. The results list may span pages and pages and display every item in a uniform manner over (in some cases) millions of web pages. This willfully removes context and allows the user to see only a fraction of the results at a given time. The ordering of the lists impacts how search engines earn revenue. Search engines sell advertising near the top of lists (paid search) from companies that seek to optimize their data to increase their search ranking (search engine optimization, or SEO). The lack of visual differentiation and opaque methodology make comparing objects difficult and forces users to guess at the relative relevance of each item.

Existing graphical user interfaces presenting information in grids are also problematic. With cable and satellite television, for instance, hundreds of channels may be available for viewing at a time. In traditional methods, a channel guide typically presents television programming in a grid, listing channels vertically and broadcast times horizontally. E-commerce sites also use grids. AMAZON.com, for instance, provides a customer with four ways to navigate items for sale: GRIDS: rectangular grids of product images that can run for multiple pages; MENUS: that force shoppers to systematically narrow choice as they seek to find a product or product category; RECOMMENDATIONS: an algorithm used to present a handful of choices without context based on what a shopper might like; or SEARCH: the proactive system described above. These methods do not simplify the shopping process and, in some cases, narrow the choices offered by the retailer.

While there are many existing systems for displaying information, these types of systems can be improved.

SUMMARY OF THE INVENTION

The following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

The example embodiments may be directed to a system, an apparatus, a device, a method, and computer readable medium. In an example, a server may be configured at least to perform identifying a consumer associated with a device, generating a consumer vector comprising a consumer interest score for each of a plurality of items, generating a second vector, selecting a subset of the plurality of items, and adjusting at least two visual attributes of each item in the subset for display in a graphical user interface based on the consumer vector and the second vector.

BRIEF DESCRIPTION OF THE DRAWINGS

The invention may be better understood by reference to the detailed description when considered in connection with the accompanying drawings. The components in the figures are not necessarily to scale, emphasis instead being placed upon illustrating the principles of the invention. In the figures, like reference numerals designate corresponding parts throughout the different views.

FIGS. 7A-B illustrates different sizes of images and image scaling in accordance with example embodiments.

Figure 1:
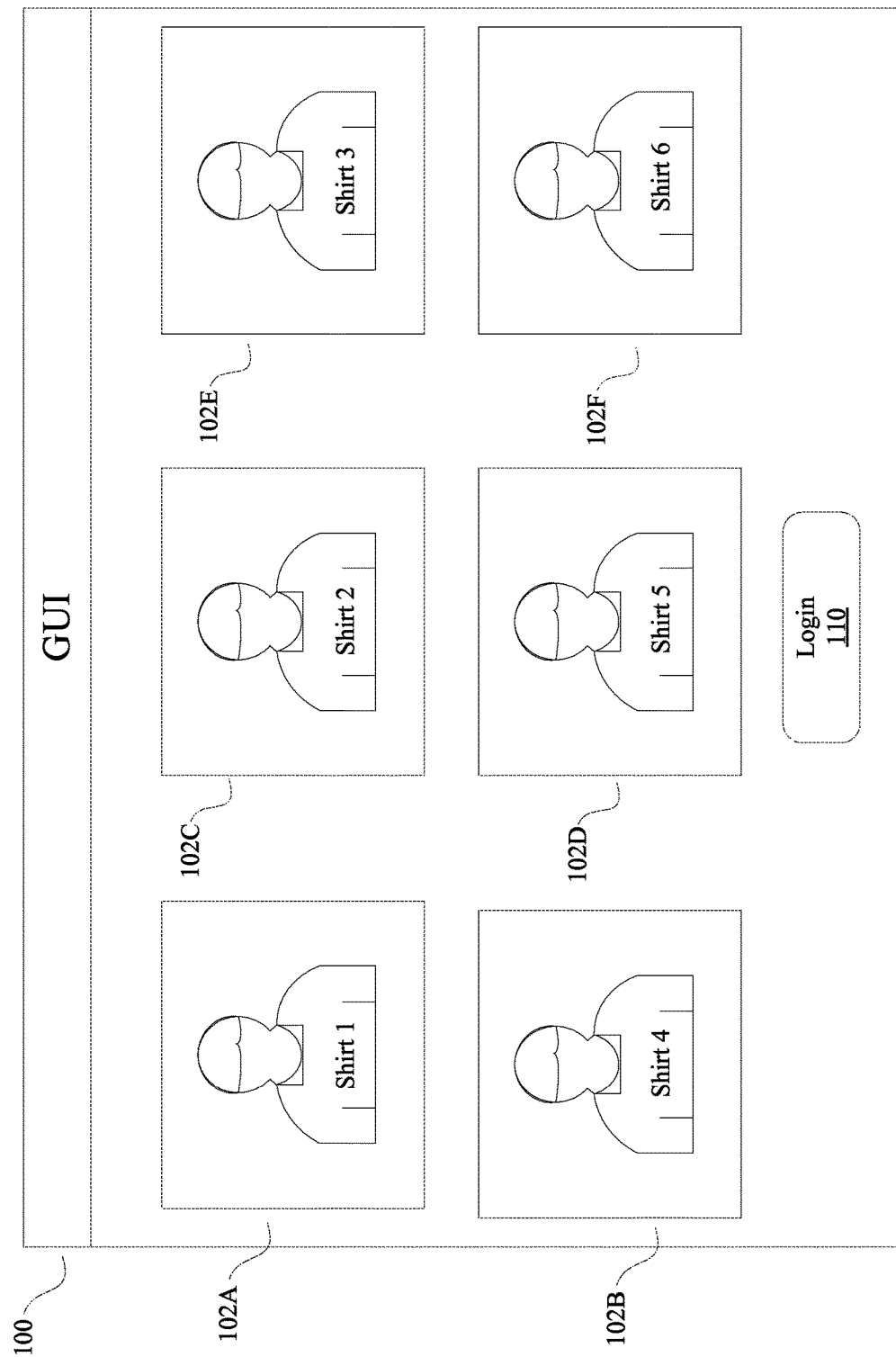
FIG. 1 illustrates a grid-based graphical user interface in accordance with example embodiments.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required.

It will also be understood that the terms and expressions used herein are to be defined with respect to their corresponding respective areas of inquiry and study except where specific meanings have otherwise been set forth herein.

DETAILED DESCRIPTION

The present invention now will be described more fully with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, systems, computer readable media, apparatuses, or devices. Accordingly, the present invention may take the form of an entirely hardware embodiment, an entirely software embodiment, or an embodiment combining software and hardware aspects. The following detailed description is, therefore, not to be taken in a limiting sense.

With virtually endless choice, people expect to find something they love when they shop, watch TV, attend trade shows or look for restaurant options. Limited time and the wrong tools can make navigating lots of choice a frustrating and unfulfilling experience. Currently, consumers use search engines, recommendation systems, or display grids offering a seemingly endless amount of choice. These incumbent technologies fail to help consumers understand their choices, and they lack visual cues for consumers to simplify complexity. When people cannot easily find something they want, they give up or settle for inferior options. This can result in retailers losing sales, cable companies losing subscribers, and trade show operators losing attendees.

To overcome these and other issues, a Consumer Intelligence ("CI") system in accordance with example embodiments may synthesize information about items available for display, consumer preferences, and influential social connections, to display information in a graphical user interface that improves a consumer's ability to quickly and easily make purchasing decisions or other selection. The example embodiments may help consumers quickly identify items for purchase or selection, often resulting in improved consumer happiness and conversion rates, and increased spending/consumption.

Figure 9:
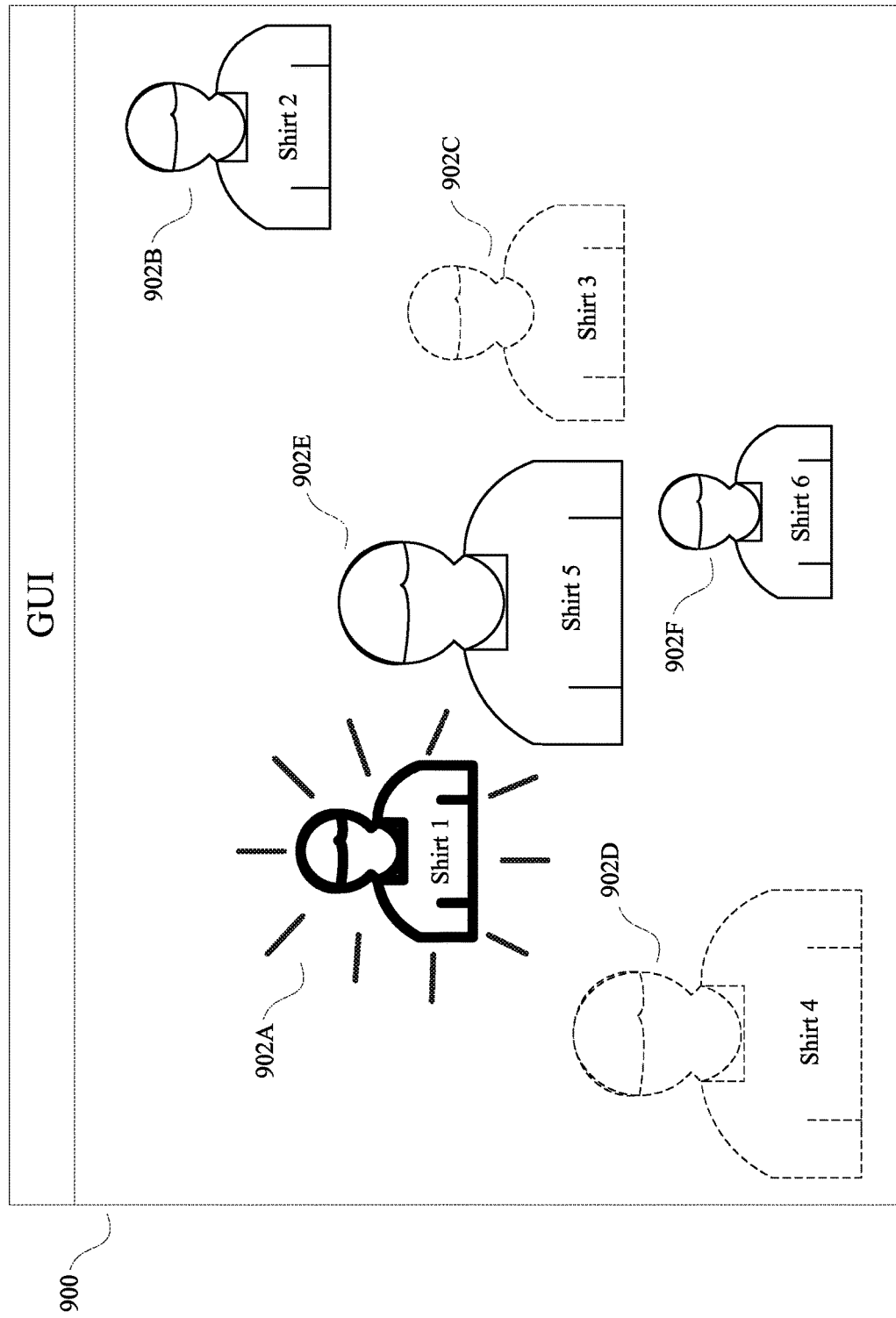
FIG. 9 illustrates a visually organized graphical user interface in accordance with example embodiments.

In an example, the CI system may organize a grid-like display of items, as depicted in GUI 100 shown in FIG. 1, into a visually organized display of items, as depicted in GUI 900 shown in FIG. 9. In an example, the GUI 100 may be a webpage or other portal presented by a display screen of a user device 1201. An item may be a product, a service, or both, that is, for example, available for purchase from the merchant using the GUI 100. In another example, an item may list a conference that a consumer can attend. Generally, an item may be something that can be displayed as a group and individually selected. The user device 1201 may be a computer, a smart phone, a tablet computer, or other device that has a display screen. Field 110 may prompt the consumer to login to organize the display of items 102 on GUI 100 based on importance to the consumer, the consumer's associates in a social network, and/or to the merchant.

Figure 2:
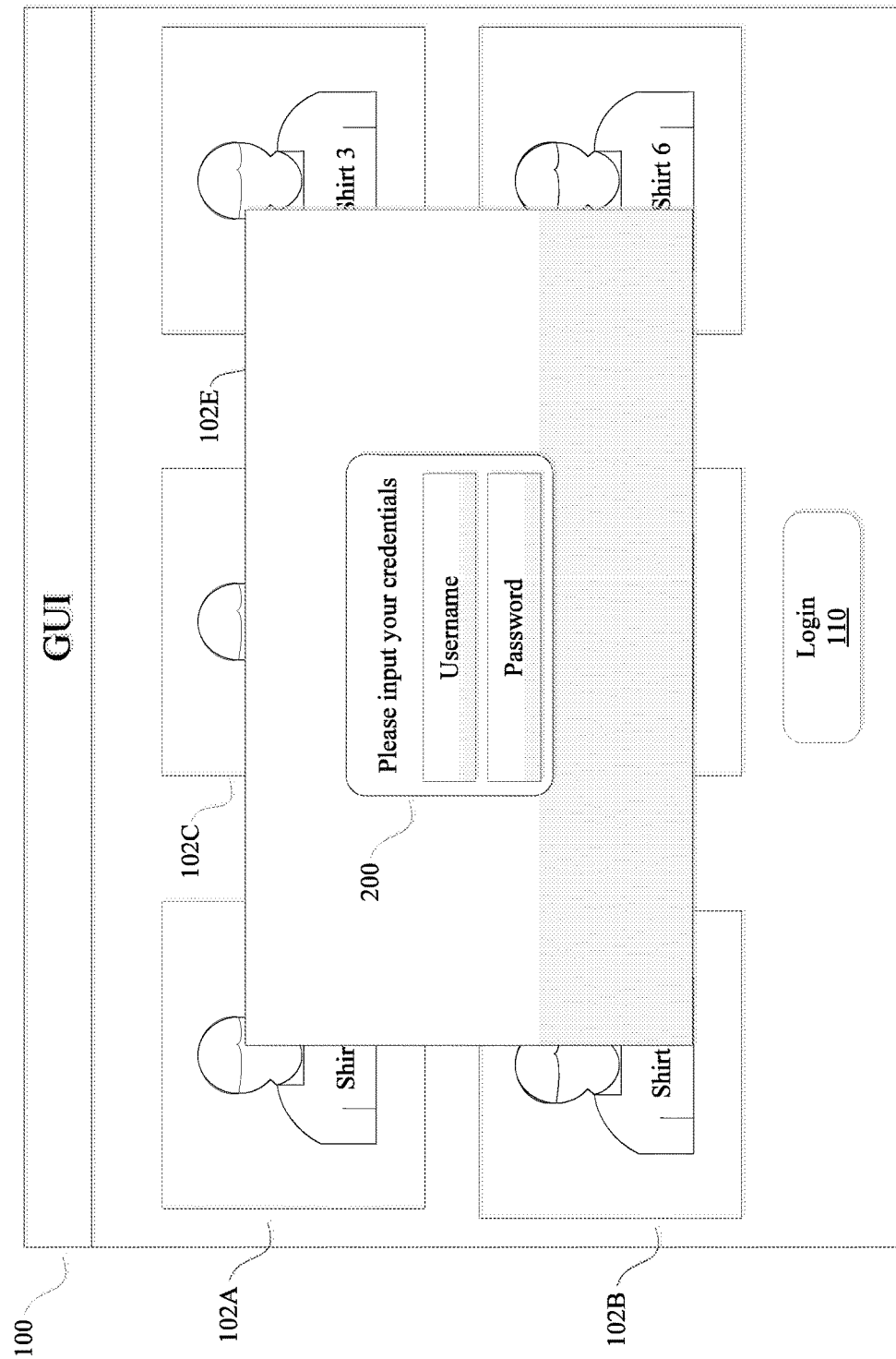
FIG. 2 illustrates a graphical user interface prompting for credentials in accordance with example embodiments.

In response to selection of field 110, the GUI 100 may update to display a credential input field 200 that prompts the consumer to input his/her credentials, as seen in FIG. 2. Examples of credentials include a username and password, a personal identification number, and the like. The credentials may be associated with the merchant, a social network, and the like. In an example, the same credentials may be used to login to one or more different merchant websites or social networks. The consumer may establish credentials when signing up for an account with a social network (or other portal) and the credentials may be subsequently used to authenticate the consumer. During credential establishment or at subsequent times, the server 1241 may prompt the consumer to provide information about likes and dislikes (e.g., via answering questions, selecting interests, etc.) to learn about the consumer. The server 1241 may store this information in a consumer profile in a database 1425. The server 1241 may update the consumer profile over time based on what items the consumer views, selects, and/or purchases, regardless of what merchant portal (e.g., website) the consumer uses. The database 1425 may store consumer profiles for multiple consumers. The example embodiments will describe items as being available for purchase, however, it will be understood that the operative action may not involve any purchase and instead may be a selection.

After the consumer has input his/her credentials, the user device 1201 may communicate the input credentials to a server 1241 for verification. The user device 1201 may additionally communicate merchant information identifying the merchant associated with the GUI 100. For example, the user device 1201 may communicate the merchant's name, URL, a unique name, code, or number assigned to the merchant, and the like.

Figure 3:
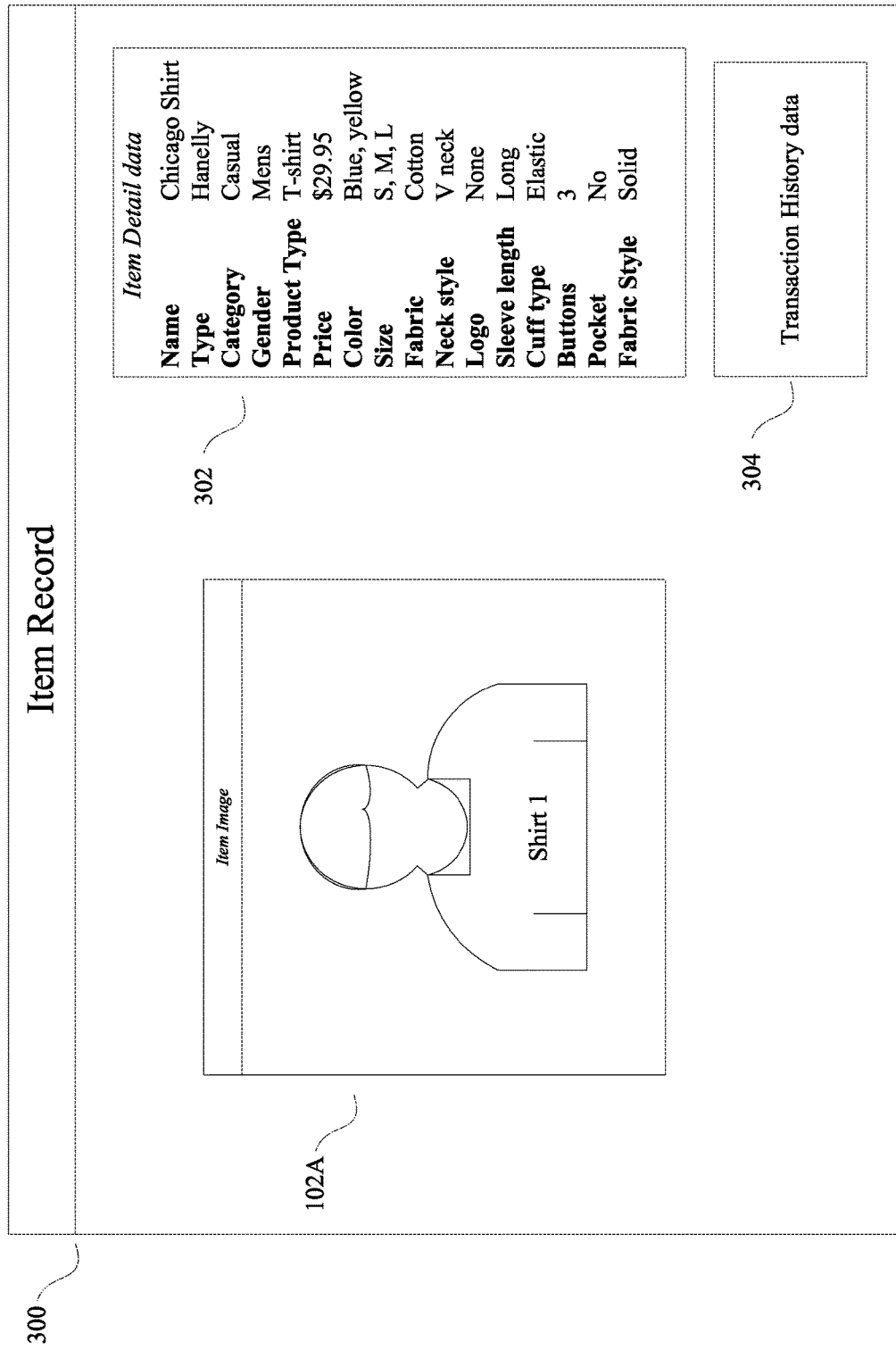
FIG. 3 illustrates an item record in accordance with example embodiments.

Once the consumer has been authenticated, the server 1241 may process the merchant identifying information and then proceed through a discovery process to determine what items the merchant has available to display. For example, database 1425 may store item records for some or all items available for purchase from the merchant, and for items available for purchase from other merchants. An item record may include descriptive information about the item, an example of which is shown in FIG. 3. In an example, the item record may include image data for the item (e.g., picture of a shirt), item detail data 302, and transaction history data 304. The item detail data 302 may include attribute-value pairs listing information about attributes of the item. For example, a name attribute for a shirt may have a value of "Chicago Shirt," a gender attribute may have a value of "mens," and a neck style attribute may have a value of "V neck." Each product may have any desired number of attribute-value pairs.

The transaction history data 304 may include information about sales of an item and who purchased the item. Examples of transaction history data include a total number of items sold, an identifier of each consumer who purchased the item, when the item was first offered for sale, one or more purchasing trends for the item (e.g., item sold 15% more this week than last week, etc.), a merchant identifier for each merchant that sells an item, and the like.

The server 1241 may process the item records 300 to determine what items should be presented to the consumer and how to visually organize those items for display in GUI 900. In an example, the server 1241 may select items based on the consumer's interests, interests of the consumer's social associates, and the merchant's interests. The server 1241 may use the interest information to vary visual attributes (e.g., the size, opacity, location, placing a border around an image, etc.) of the image of each item displayed in visually organized GUI 900. In an example, the size of an item's image may be controlled based on determined consumer interest, the opacity may be controlled based on determined consumer's social associate's interest, and the location may be controlled based on what items a merchant desires to showcase. The visual attributes may also be controlled in other manners.

The server 1241 may generate vectors to represent consumer, associate, and merchant interests. In an example, a consumer vector may score items based on the consumer's interest, a social vector may score items based on interest of the consumer's social associates, and a promotion vector may score items based on what items the merchant desires to showcase to the consumer (e.g., such as giving prominence to an item the advertiser wishes to promote).

Figure 4:
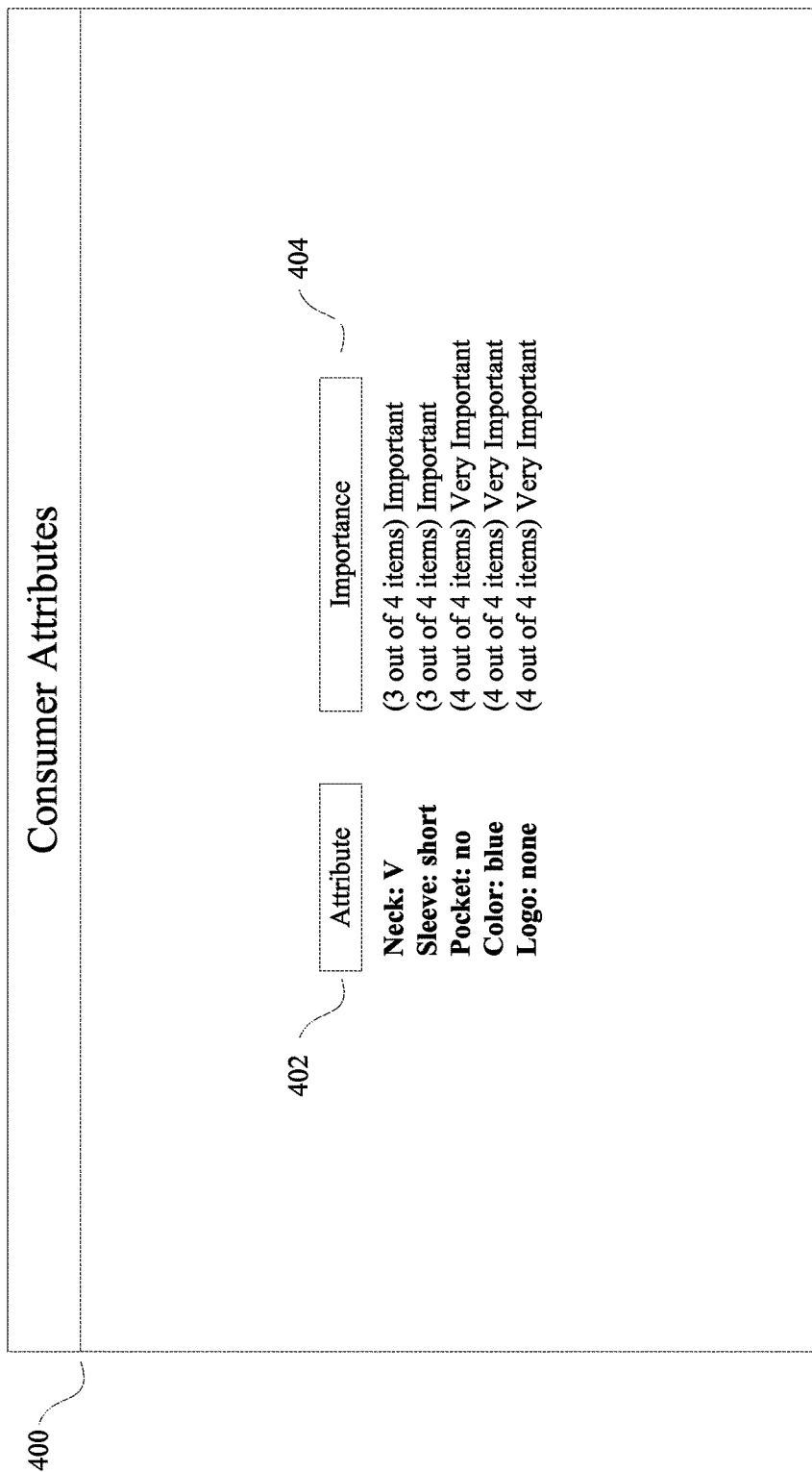
FIG. 4 illustrates consumer attributes in accordance with example embodiments.

With reference to FIG. 4, the server 1241 may process the item records 300 to assess a consumer's interest in items available for purchase to generate a consumer vector. The consumer vector may be a listing of unique item identifiers and a consumer interest score for each item. A consumer interest score may represent how well attributes of an item match attributes of other items the consumer has previously purchased. In an example, a consumer may use the user device 1201 to display shirts in GUI 100 that are available for purchase. The server 1241 may determine an item category (e.g., shirts) for the items being displayed and search the database 1425 to identify what shirts the consumer has purchased in the past. For example, the server 1241 may communicate a query including a unique identifier of the consumer and an item category code (e.g., shirt category), and the database 1425 may return some or all item records 300 for shirts the consumer previously purchased.

The server 1241 may process the item records 300 to determine what attributes, if any, are common to previously purchased items. For example, a consumer may have previously purchased four shirts that have five common attributes: V neck, short sleeve, no pocket, traditional color, and no logo. The server 1241 may rank the attributes based on importance to the consumer. The server 1241 may assess importance of each attribute based on how many of the purchased items have a particular attribute. For example, the server 1241 may determine that pocket, color, and logo attributes are very important because the purchased items all have the same value for a particular attribute (e.g., no pocket, traditional color, and no logo). The server 1241 may determine that neck style and sleeve length are important to the consumer because they are common to a majority of the items purchased. The server 1241 may select a subset of the attributes based on importance for generating the consumer vector. For example, the server 1241 may select all attributes where at least a predetermined number of purchased items have a particular value for that attribute (e.g., at least 50% of purchased shirts are V neck, at least 65% of purchased shirts do not have a logo, etc.).

Figure 5:
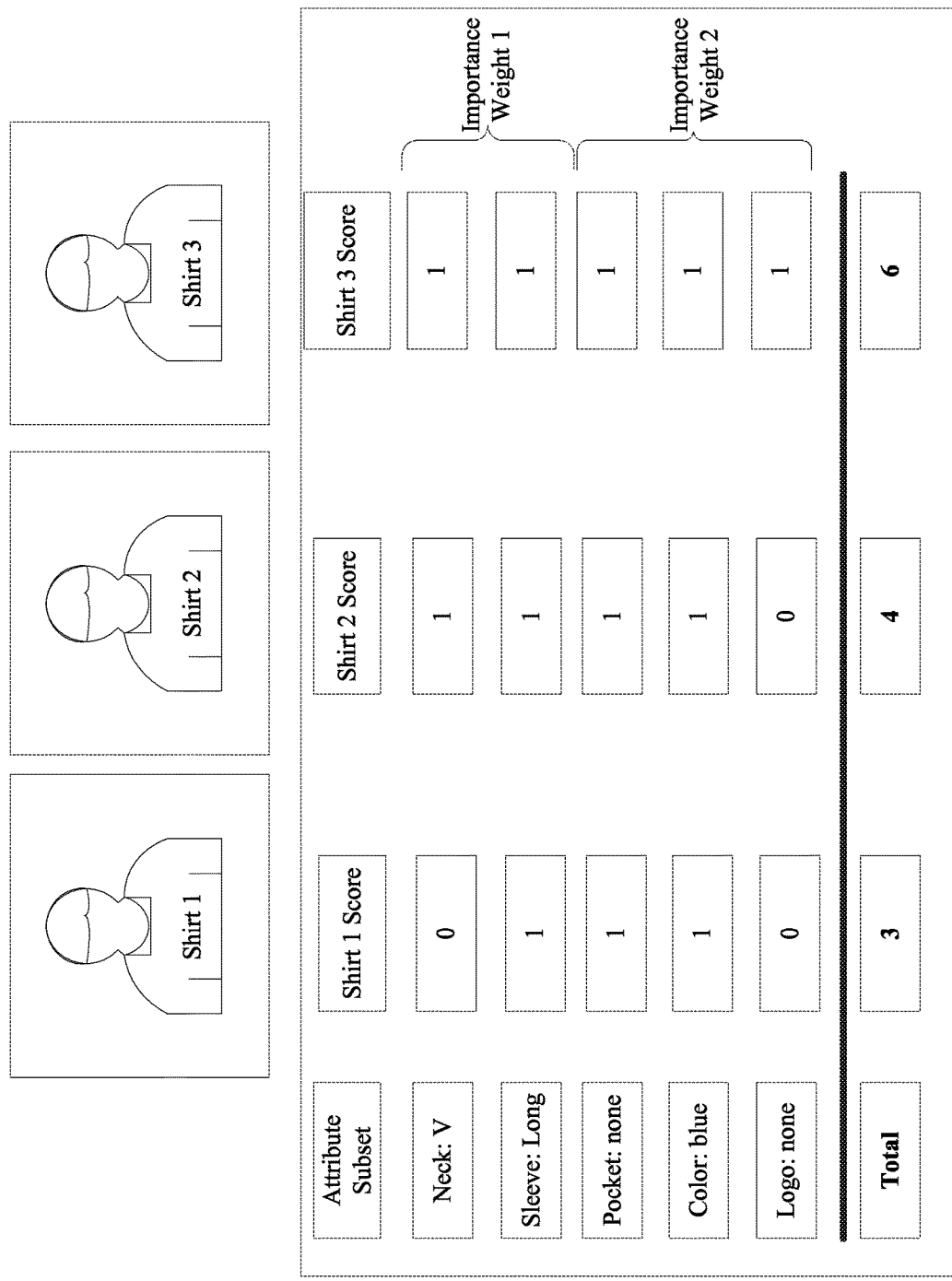
FIG. 5 illustrates scoring of items in accordance with example embodiments.

The server 1241 may score available items based on whether they have the same or similar attributes as items typically purchased by the consumer. As seen in FIG. 5, multiple shirts are scored for multiple attributes. The depicted attributes include a neck attribute, a sleeve attribute, a pocket attribute, a color attribute, and a logo attribute. Other attributes instead of or in addition to these attributes may be scored. In a simple example, the server 1241 may assign a value of "1" if an available item has the same attribute value (e.g., V neck) and a value of "0" if it does not.

To score the neck attribute, for example, the server 1241 may determine that most shirts purchased by consumer have a V neck. With reference to FIG. 5, shirts 2 and 3 have V necks and hence each receive a score of 1, whereas shirt 1 does not have a V neck and receives a score of zero. Other numerical values may be assigned to the attributes instead of 1 and 0, such as the z-scoring algorithm described below. Server 1241 similarly scores shirts 1-3 for the remaining attributes, and totals the scores to determine a consumer interest score for that item. The consumer interest score may be a weighted total based on the importance of the attributes. For example, some attributes may be weighted more heavily than others. To determine the weightings, the server 1241 may store information and log consumer information. For example, server 1241 may update a consumer profile of a consumer based on which items displayed in GUI 900 the consumer viewed, clicked on, selected, purchased, or otherwise interacted with. Server 1241 may use the consumer profile to more heavily weight attributes in items the consumer actually purchases and reduces weightings of attributes in items the consumer views but does not purchase.

In an example, the server 1241 may score items using a z-scoring algorithm for some or all possible items (e.g., products, digital files, events) that could be displayed in GUI 900. The server 1241 may create a z-score for each item based on two elements: (1) conversion data and (2) view data. Conversion data may indicate that a conversion has occurred for an item. A conversion may be a purchase in an e-commerce setting, download of a file, view of a video, attendance at an event, and the like. It is noted that a conversion may have different meaning in different contexts. In some examples, the server 1241 may assume that, once converted (purchased), an item is no longer in contention for a given consumer. In other examples, an item may be converted two or more times and previous conversions may be a strong positive indicator for a high rating (e.g., a consumer may stream the same song more than once). View data may include a count of the number of times the consumer has viewed an item. The server 1241 may use conversion data and view data as a proxy to measure a consumer's interest in each item.

The server 1241 may convert the conversion data and the view data of an item into consumer interest scores, using a z-scoring algorithm, where a z-score may be a scalar quantity defined on a closed interval. In an example, a closed interval may include endpoints. For instance, an interval of [0,1] is a closed interval including all numbers between 0 and 1, and also including the numbers 0 and 1 themselves. Contrast this with (0,1) which is an open interval comprising all numbers between 0 and 1, but excluding 0 and 1 themselves.

The server 1241 may also scale the consumer interest score between a minimum and maximum level of conversions and/or views. For example, if an item in question is a pair of socks on an e-commerce fashion site, then views may vary from 0 to 3, with greater values being rare. In another example, on a dating site, the items (e.g., people) may be individual consumers viewed 10 or 20 times before conversion (e.g., sending a message).

The following provides a more detailed example of converting views into a consumer interest score using a z-scoring algorithm. As described below, the server 1241 may determine the total number of views of a particular item by a consumer, subtract the mean (e.g., across all items), and divide by the standard deviation (across up to all items). For instance, let $v(i,j)$ be the views for consumer i of item j and $c(i,j)$ be the conversion for consumer i of item j. Let the mean number of views across all items for consumer i be $m\_v(i)$ and the standard deviation of those views for consumer i be $sd\_v(i)$. A z-score for views by consumer i of item j is then $z\_v(i,j)=[v(i,j)-m\_v(i)]/sd\_v(i)$.

Based on those definitions, the server 1241 may assign a consumer interest score to item j for consumer i as follows:

IF conversions for consumer $i$ for item $j>0$ THEN
   consumer_interest_score$(i,j)=0$;

ELSE consumer_interest_score$(i,j)=1/(1+\exp(-z\_v(i, j)))$ where exp( ) refers to the exponential function, which scales the consumer interest score on the interval (0,1) and the consumer interest score may be expressed as a percent. For example, a z-score representing an item whose views were 2 standard deviation below the consumer's average would have a consumer interest score of 12% while a z-score of 0 (the average) would have a consumer interest score of 50%. An item whose z-score was 3 (3 standard deviations above average for the consumer) would have a consumer interest score of 95%.

The server 1241 may form the consumer vector identifying each item and its corresponding consumer interest score. An example consumer vector is as follows:

Consumer vector={[item 1,score=3];[item 2,score=4];[item 3,score=5]}

The server 1241 may use the consumer interest score for each item in the consumer vector to select the size of an image of the item displayed in GUI 900.

Figure 6:
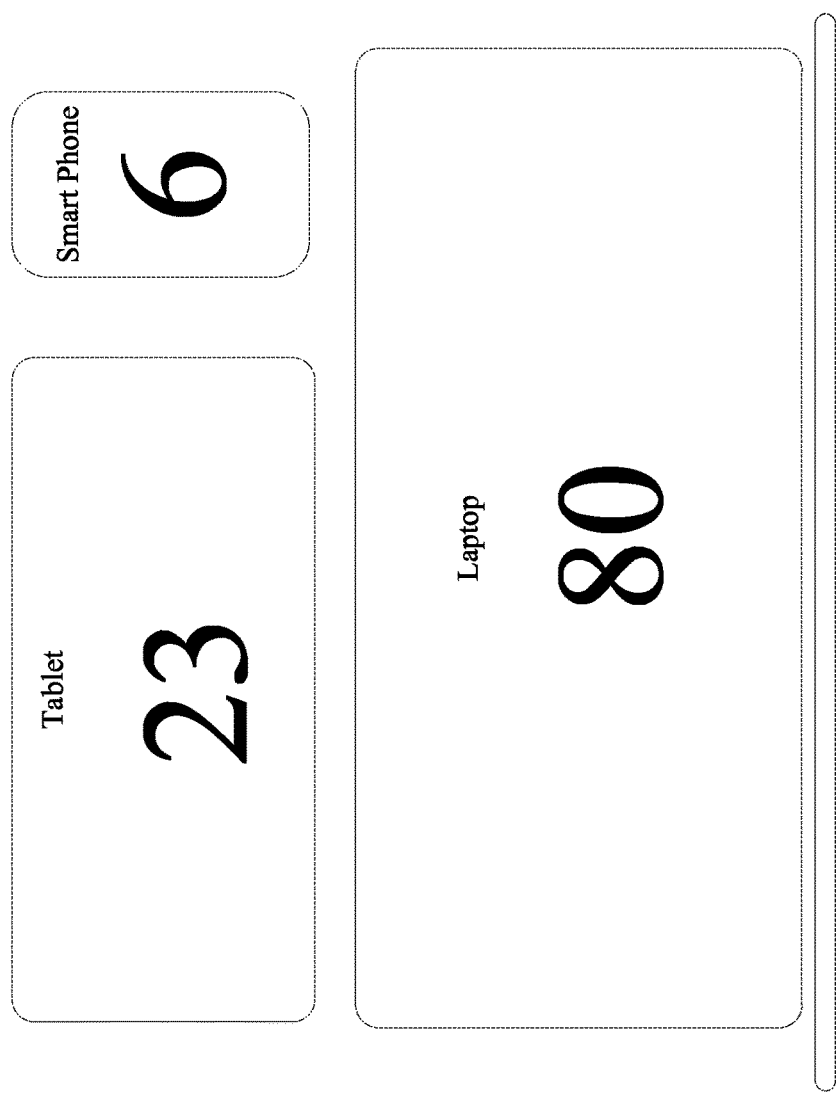
FIG. 6 illustrates different sizes of display screens in accordance with example embodiments.

In some examples, the server 1241 may determine how many items can be displayed in GUI 900 based on the size of the user device's display screen. As seen in FIG. 6, server 1241 may limit to 6 the number of items that may be displayed on a smart phone, 23 on a tablet computer, and 80 on a laptop computer. The item limits may be other numbers and may also be varied based on the merchant and/or item being displayed. Based on the item limit, the server 1241 may select the items to display in GUI 900 having the highest total scores in the consumer vector (e.g., 6 highest scored items for a smart phone, 23 highest scored items for a tablet, etc.).

Figure 7A:
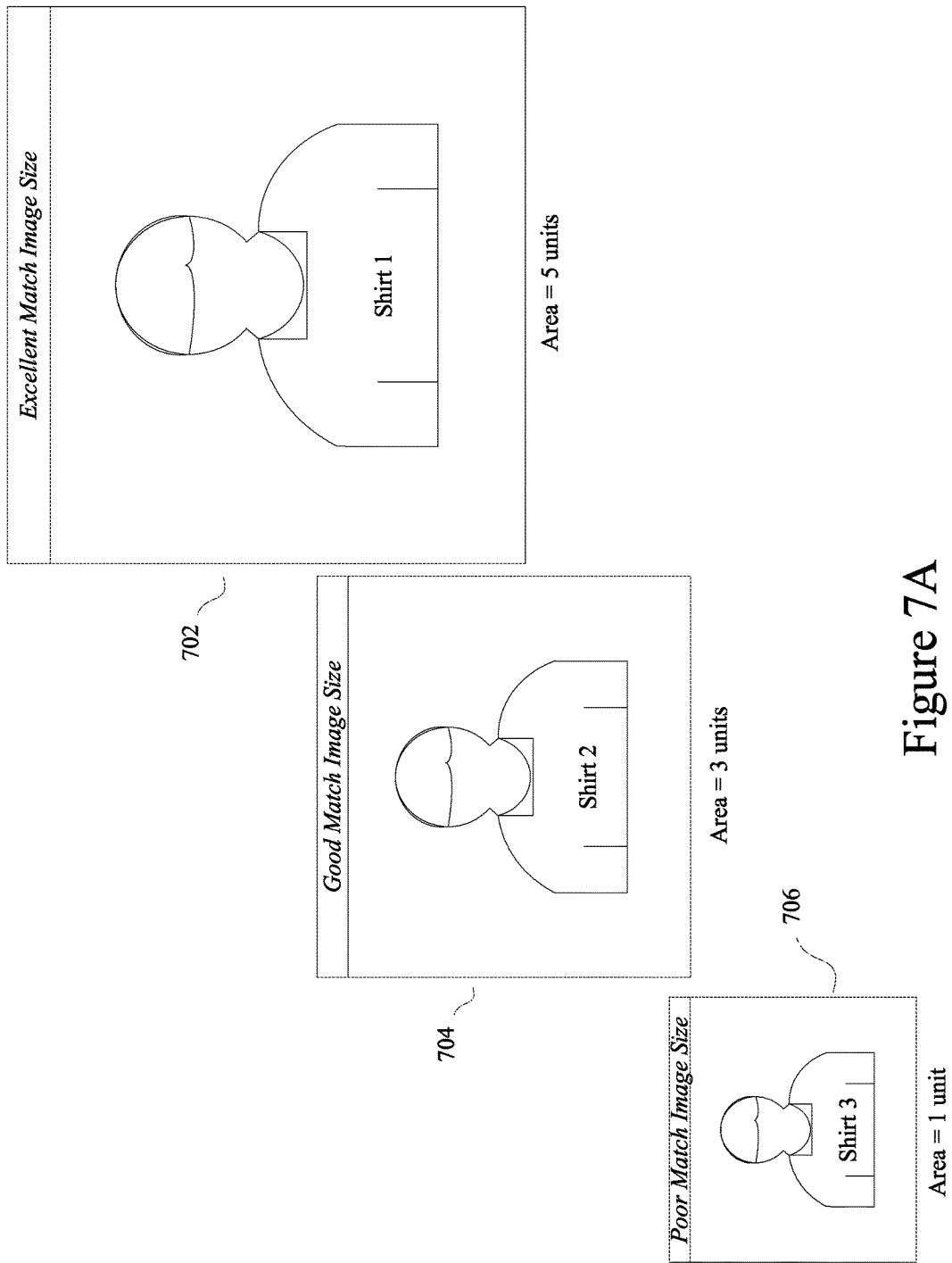

The server 1241 may select what size to display the items based on the consumer vector and the item limit. For example, images of items may be displayed in a predetermined number of sizes. FIG. 7A, for instance, depicts a large image 702 for an item having an excellent match (e.g., the set of one or more items having the highest scores), a medium image 704 for an item having a good match (e.g., the set of one or more items having the next highest scores), and a small image 706 for an item having a poor match (e.g., the set of one or more items having the subsequent highest scores). To determine the relative sizes, the server 1241 may scale images to correspond to size parameters. For example, an image for a poor match may be scaled to an area of 1 unit, an image for a good match may be scaled to an area of 3 units, and an image for an excellent match may be scaled to an area of 5 units. Scaling may also consider a total amount of area available to display images relative to a total amount of available space. As seen in FIG. 7B, the total image area is a fraction of the total available space. Server 1241 may use Bayesian algorithms and rules to determine which items to include and exclude in the total image area. In some examples, the server 1241 may scale and arrange the images such that none overlap, whereas server 1241 may permit image overlap in other embodiments. Server 1241 may also limit the number of items that can be displayed at a particular size. For example, only 2 images shown on a smart phone may be a largest size, only 1 may be a medium size, and the other 3 may be a smallest size.

In an example with reference to FIG. 9, user device 1201 may be a smart phone that is permitted to only display six items in GUI 900. Server 1241 may communicate data of the GUI 900 and instruct user device 1201 to display the GUI 900. As depicted, shirts 4 and 5 are the largest because they have the highest consumer interest scores, shirts 2 and 3 are a medium size because they have the next highest consumer interest scores, and shirts 1 and 6 are a smallest size because they have the smallest consumer interest scores.

In addition to selecting the size of each item to be displayed, the server 1241 may generate a social vector to control the opacity of each item displayed in GUI 900. Opacity may be based on scores derived for the displayed items based on interest levels in the items according to the consumer's social associates. Briefly, a consumer may utilise a social network to create connections with other users. For example, a consumer may send invites or friend requests asking other users to become connected to the consumer on the social network. The social network may be used to share information, photos, messages, and the like.

To generate the social network vector, the server 1241 may determine what other users the consumer is connected to on one or more social networks. These other users are referred to herein as "social associates." For example, the server 1241 may retrieve a list of the consumer's social associates from one or more social networks and update the consumer's profile with the list. Examples of associates include individuals the customer has identified as being friends in Facebook, Linkedin Connections, and the like. The server 1241 may also monitor activities of the social associates and update the consumer profile with associate interest data (e.g., what items the associates view and/or purchase). The term social associate may not require the consumer to have a friendly relationship with a particular social associate. Social associates may also include competitors or adversaries of the consumer (e.g., business rivals, competing stockbrokers, and the like). The server 1241 may also be informed of social associates from data sources other than social networks. For example, the consumer may use user device 1201 to upload a listing of social associates instead of or in addition to identifying social associates via one or more social networks.

The server 1241 may determine the interests of the social associates to generate the social vector. The social vector may represent an interest level for the social associates in items being displayed in GUI 100, and may be used to control the opacity of displayed items. Items that the social associates would find interesting are displayed brightly (e.g., most opaquely), whereas less interesting items are displayed with increasing amounts of transparency, with the least interesting items being the most transparent.

In some examples, the server 1241 may assume that all associates are matched, although data from mismatches, partial matches, non-matches, and/or systematic non-matches may also be considered. In some versions, there might not be any matches at all. In some known social networks (e.g., Facebook) mismatches are highly unlikely because of the unique ID codes assigned to each user, but other social systems could potentially be used in which matching is done on data that is open to interpretation. For example, server 1241 may apply fuzzy logic systems to determine whether "Mike Smith at 123 Main Boulevard in Chicago" is the same person as "Michael Smith at 123 Main Blvd in Chicago." Alternatively, there may be two individuals named "John Smith" both living in Queens, N.Y. Existing approaches for handling these types of matches may produce a score (often scaled 0-100) providing a degree of confidence in the match. The server 1241 may use these scores to given greater influence to matches that have higher levels of confidence.

The server 1241 may assign some social associates as having higher levels of influence than others. The server 1241 may weight all social associates equally or my assign differing weights to certain associates. For instance, the server 1241 may determine a closeness between the consumer and each of the social associates. Closeness may be based on frequency of messages shared via a social network, frequency in which the consumer appears in photos with the social associate, and the like. Only the social associates having a certain amount of closeness to the consumer may be deemed to have any influence on the consumer, and thus the interests of more distant social associates may be ignored. In other examples, greater weight may be given to interests of closer associates, and lesser weight may be given to interests of more distant associates. If equally weighted, a consumer with 10 associates each with 5 views of an item is equivalent to a consumer with 20 associates, of whom 5 have 10 views each of the item and 15 have no views of the item. In each case, the item in question was viewed 50 times by the consumer's associates. The server 1241 may also weight associate interest scores differently depending upon which social network is the source of the conversion and/or view data. For example, data from one social network may be weighted more heavily than another.

The server 1241 may generate the social vector in a manner similar to how the consumer vector is generated above. With reference again to FIG. 4, the server 1241 determines what attributes are important to each of the social associates, and the values for each of those attributes. With reference to FIG. 5, the server 1241 determines total scores for the items based on the important attributes. In this example, the scored items are only the ones the server 1241 has selected to display in GUI 100 based on the consumer vector. The server 1241 then averages the scores, or performs some other mathematical combination of the scores resulting from the various social associates, for the same item to determine a social associate interest score, and then forms a social vector listing the social associate interest score for each item (e.g., social vector=[item 1, avg. score=4.3], [item 2, avg. score=3.5], [item 3, avg. score=2.6], and so forth).

As with the customer interest scores, the server 1241 may also generate a social associate's interest score for each item based on applying a z-scoring algorithm to conversion and view data for the social associates. In an example, the server 1241 may transform social network conversions and views into social associate interest scores using the following algorithm:

Definitions $nn(i)$=number of associates for consumer i $nc(i,j)$=total conversions by associates of consumer i for item j $nv(i,j)$=total views by associates of consumer i for item j $nm\_c(i)$=mean number of conversions for consumer i's associates across all items $nm\_v(i)$=mean number of views per consumer for a given item $nsd\_c(i)$=standard deviation of total conversions for associates of consumer i across all items $nsd\_v(i)$=standard deviation of total views for associates of consumer i across all items B=weight parameter for number of views equal to one conversion Let $x(i,j)=[B*nc(i,j)]+nv(i,j)$ Let $n\_mean(i)=[B*nm\_c(i)]+nm\_v(i)$ Let $n\_sd(i)=sqrt\{[1/((B+1)^2)*n(i)]*[((B^2)*nsd\_c(i))+nsd\_v(i)]\}$ And let $nz(i,j)=[x(i,j)-n\_mean(i)]/n\_sd(i)$ Now assign the rating as follows:

IF matches(i)=0 THEN social_associate_interest_score(i,j)=0.5 for all j;

ELSE social_associate_interest_score(i,j)= $1/(1+exp(-nz(i,j)))$

Parameter B may indicate the relative worth of a conversion versus a view. For a given consumer, there are statistical means by which to estimate this (e.g., at an item level). Parameter B may be manually set on an advertiser-level and apply across all consumers and items for that merchant.

The server 1241 may then apply a scale based on the social vector to set opacity for each of the items. In a simple example, a first item having a highest social associate interest score in the social vector may be the brightest (e.g., completely opaque), a second item having a next highest social associate interest score may be 5% transparent, a third item having a next highest social associate interest score may be 13% transparent, and so forth. In a more detailed example, maximum and minimum opacity levels may be set for each image (e.g., max opacity=100%, minimum opacity=30%). The server 1241 may apply a logarithmic or arithmetic scale based on the social associate interest scores, in view of any max/min opacity levels, to determine an opacity level for each image. For example, server 1241 may apply a linear scale to order the social vector. The sever 1241 may multiply a z_score (e.g., 25%) by the range (e.g., maximum less minimum, or 100%–30%=70%) and add back the minimum (in this case, 30%) to set the opacity. In this example, 0.25×70%+0.30%=48%. The resulting item would thus be displayed 48% opaque and 52% transparent. In another example, the server 1241 may apply a logarithmic scale to order the social vector. The server 1241 may take the exponent of the z_score. For example, a z_score of 1.00 would be approximately 2.71; and a z_score of 0.25 would be approximately 1.28. The server 1241 may divide the exponent of the z_score by 2.71. This reduces the difference in opacity between images. The server 1241 may use this in the linear scale formula discussed above. The server 1241 may multiply the exponent of the z_score (e.g., 1.28/2.71, or 0.472) by the range (e.g., maximum less minimum, or 100%–30%=70%) and add back the minimum (in this case, 30%) to set the opacity. So 0.472×70%+0.30%=63%. The resulting item would thus be displayed 63% opaque and 37% transparent.

Server 1241 may cause user device 1201 to update the GUI 100 to show images of the items based on their determined opacity. With brief reference to FIG. 9, item 902A, for example, is the brightest and most opaque (represented by bold lines), items 902B, E, and F are the next most opaque (represented my medium weight, solid lines), and items 902C, D are the most transparent (represented by dashed lines).

The server 1241 may also arrange the selected items 902 in the GUI 900 based on what items the merchant wishes to showcase. For example, a merchant can select between factors such as price, margin, and promotion to select how to arrange the items 902, where to locate the items (e.g., center, left, right, top, bottom, upper left corner, lower right corner, etc.), whether to emphasize items previously abandoned in a shopping cart, whether to highlight blogger selections, and the like.

Figure 8:
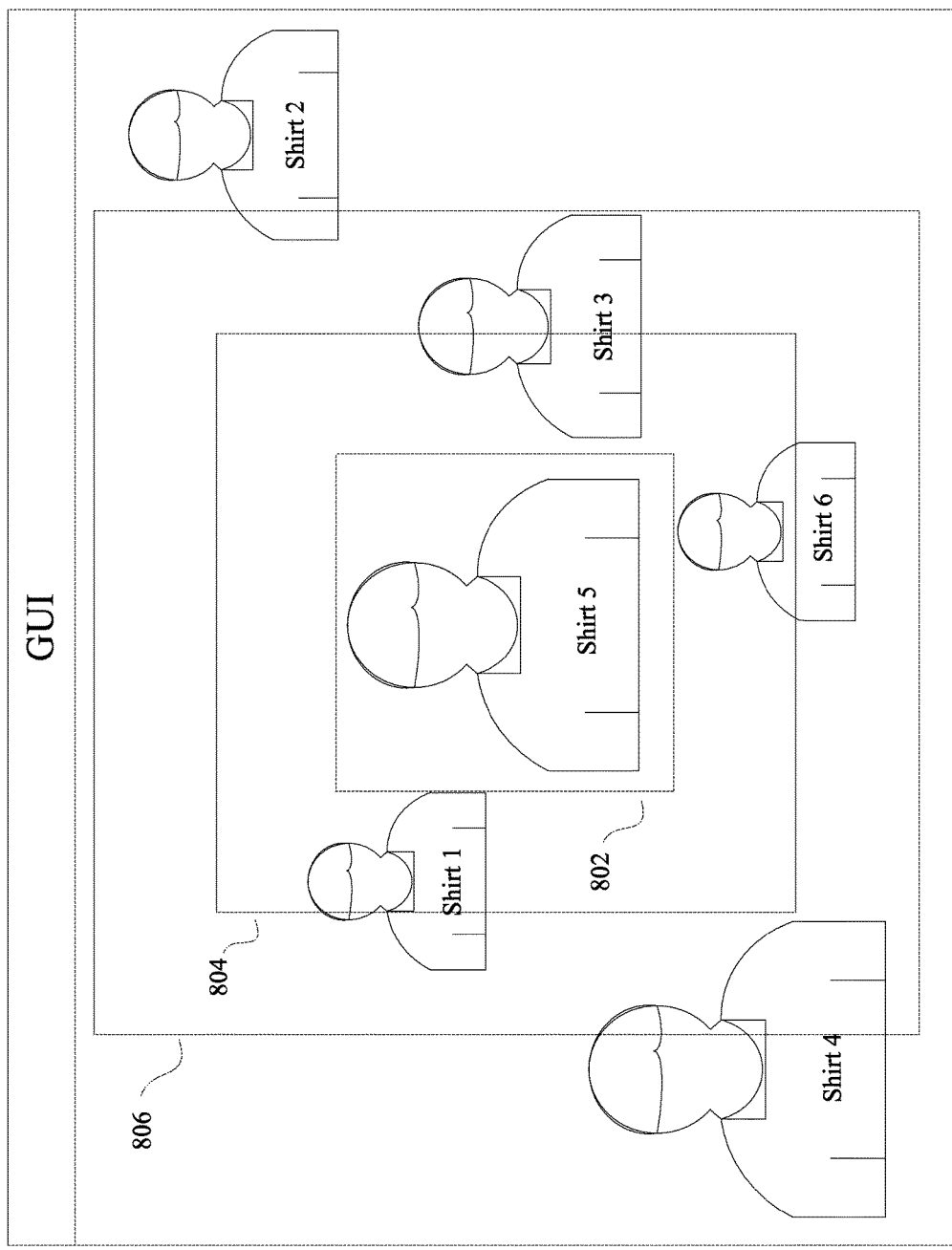
FIG. 8 illustrates item spacing in accordance with example embodiments.

The following provides an example where server 1241 creates a promotion vector for centrally locating higher priced items in GUI 900 and, the lower priced an item is, the farther it is placed from the center. The server 1241 may process item records 300 for each item to be displayed in GUI 900 to determine price information, and may create a promotion vector ranking the items in descending price order (e.g., brand vector=[item 5, price $49.99], [item 1, price $44.99], [item 6, price $43.99], [item 3, price $40.99], [item 4, price $29.99], etc.). In an example, the server 1241 may generate GUI 900 such that higher price items are centrally located. With reference to FIG. 8, GUI 900 is illustrated with boxes 802, 804, and 806 to represent spacing. As can be seen, shirt 5 is centrally located due to it having the highest price, followed by shirt 1, shirt 6, and shirt 3 shown partially within box 804 and having the next highest prices, and shirts 4 and 2 shown partially within box 806 and having the lowest prices. FIG. 9 shows GUI 100 without boxes 802, 804, and 806. Other price metrics, as well as other non-price metrics, can be used to arrange items in GUI 900.

In another example, the server 1241 may generate a promotional vector having a promotional score for each item. A merchant may specify the promotional score to influence the prominence of an item in GUI 900. In an example, the merchant may enter any number on the (0,1) interval (or the 0% to 100% scale) for each item. Each item may have a default value (e.g., pre-set to 0.5) unless the merchant changes it.

Once the GUI 900 is created based on the vectors, the server 1241 may communicate the GUI 100 to a user device 1201 for presentation on its display screen. As can be seen in FIG. 9, GUI 900 is created in a visually organized manner that uses the consumer vector, the social vector, and the promotion vector to adjust visual attributes (e.g., the size, opacity, display location, placing a border around an image, etc.) of items presented in GUI 900. For an item having high consumer, social, and promotion scores, the server 1241 may generate the GUI 900 to brightly display a larger version of an image of item in a prominent location (e.g., nearer to a center of a display screen). Conversely, for item having lower consumer, social, and promotion scores, the server 1241 may generate the GUI 100 transparently displaying a smaller version of an image of the item in a less prominent location (e.g., toward an edge of a display screen).

Figure 10:
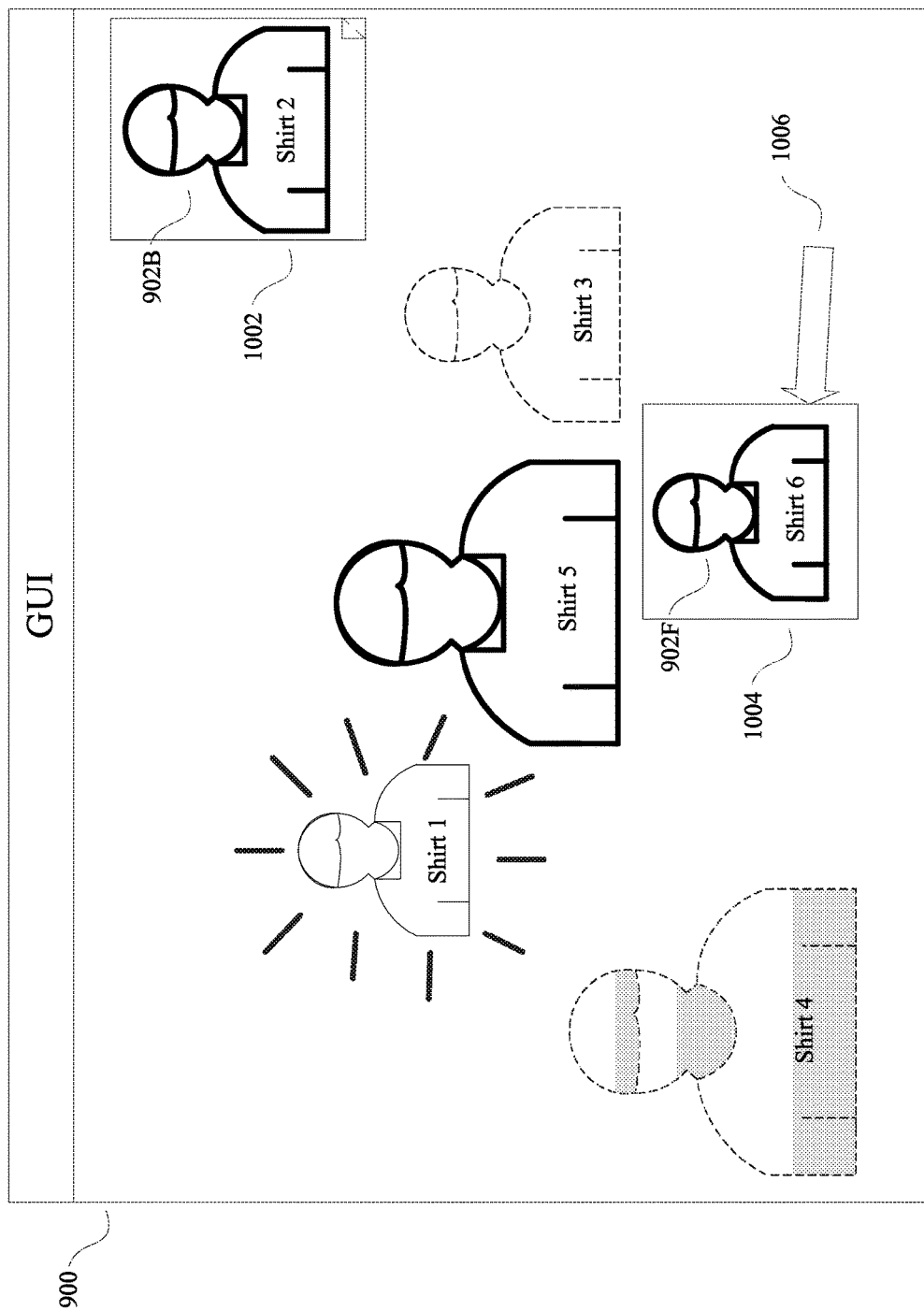
FIG. 10 illustrates a visually organized graphical user interface highlighting selected items in accordance with example embodiments.

Additionally, server 1241 may add certain embellishments to further emphasize selected items within GUI 900. As seen in FIG. 10, GUI 900 may depict a notepad 1002 enclosing item 902B to represent that item 902B is a blogger selection. GUI 900 may include item 902F in a box and/or point at it with arrow 1006 to emphasize that the consumer previously placed item 902F in his/her shopping cart, but ultimately did not purchase the item. Other types of emphasis may also be used, including, for example, push pins, flashing text, backlighting in one or more colors, placing a border around an image, and the like.

Figure 11:
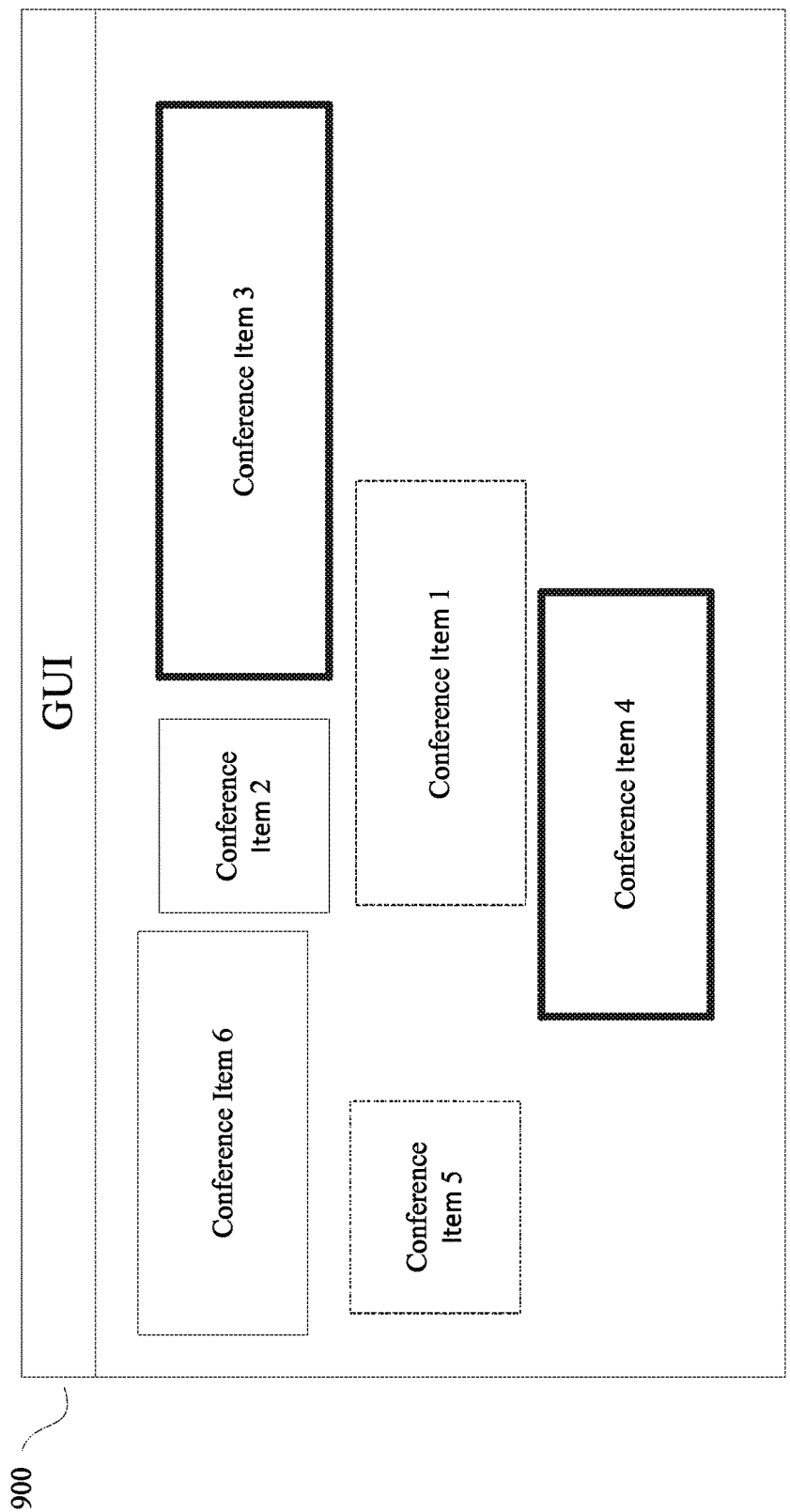
FIG. 11 illustrates a visually organized graphical user interface in accordance with example embodiments.

It is noted that the example embodiments can be used in other contexts, including non-shopping contexts. In FIG. 11, for example, GUI 1100 is a webpage illustrating conference items 1-6 that represent various meetings at a conference a consumer can select to attend. Similar to the description provided above, the location, opacity, and size of conference items 1-6 may be based on consumer, social, and promotion vectors.

It is noted that the example embodiments have been described where the consumer vector is used to control image size, the social vector controls image opacity, and the promotion vector controls image location. Any of the vectors may be used to control size, opacity, and location, and the relationships described herein are merely examples. Vectors may be used to control other aspects of images and their visual attributes, instead of or in addition to size, opacity, and location. Examples of visual attributes may include size, opacity, location on a GUI, shading, highlighting, framing, backlighting of an item in a particular color, and the like. Further, multiple vectors are not required, and instead server 1241 may use a single vector to control two or more visual attributes of an item. For example, a consumer vector may include scores that control size, opacity, location, and any combination thereof, for all displayed items. In another example, a consumer vector may be used to control a displayed size and/or opacity of an item, and a promotion vector may be used to control the location where the item is displayed on GUI 900.

In addition to generating consumer, social, and promotion vectors, the server 1241 may group like or complementary items. To aggregate items into groups, the server 1241 may define a distance metric in an item attribute space. To do so, the server 1241 may compute a number that approximates the amount of difference between two items. Over time, the server 1241 may use collected and aggregated consumer behavioral data to draw distance inferences independently, however, the server 1241 applying the first instance of the algorithm may generate tables as described below.

The server 1241 may begin with the general description of an item, such as that found in item record 300. For each item j in a set of items, there exist n attributes (where n is an integer), each of which can assume different values. The server 1241 may assign one or more of a set of pre-defined values for each attribute. Each attribute may be associated with a lookup table that assigns differences between different values. If there are attributes that exist for one subset of items, but other items do not have that attribute, the server 1241 assigns a null value, such as "n/a" or "0," for that attribute in the items that don't have that attribute.

Let the distance between two values, A and B, for attribute k be written as d(k,A,B) and be found in a lookup table. Let val(i,k) be the value of attribute k for item i. The server 1241 determines the distance D between items i and j, as follows:

$$D(i,j) = \sqrt{\sum_{k=1}^{n} [\theta(k) \cdot d(k, val(i,k), val(j,k))]^2}$$

The overall distance is the square root of the sum of the squares of the distances of each attribute, with the addition of a parameter, theta, that can be used to weight the different attributes for importance. In some instances, it may be assumed theta equals 1 in all cases. Server 1241 may use the distance D to identify and include like or complementary items in GUI 900.

Additionally, the server 1241 may log some or every action the consumer takes as part of a feedback mechanism that periodically or continually refines algorithms and weightings used to score items and attributes. For example, the server 1241 may initially weight attributes in calculating a social vector that maximizes the opacity of (or otherwise emphasizes) item 902A in GUI 900 of FIG. 9. Over time, the server 1241 may log how the consumer actually interacts with GUI 900 (e.g., what items were viewed, selected, moved to shopping cart but not purchased, purchased, and the like). If, for instance, the consumer were to select item 902D instead of item 902A, server 1241 may infer that a consumer's social associates who bought or considered or viewed item 902A are less important when shopping for products (or viewing content) at this particular merchant or type of merchant (e.g., a casual clothing store). When calculating the social vector for this consumer shopping at that particular merchant or type of merchant in the future, the server 1241 may lower the weighting for that social associate; and increase the weighting for this consumer's social associates that bought or considered item 902D. Similar refinements may be made to the other vectors, such as refining weightings used to create the consumer vector based on what how the consumer interacted with GUI 900. For example, server 1241 may log what products the consumer purchases at a particular merchant and adjust the weightings such that a consumer vector generated when shopping at a later time at a similar merchant increases the size of items displayed to consumer in GUI 900 have attributes similar to the purchased products.

Even more broadly, the CI system may gain exponential intelligence (e.g., a network effect) as more merchants deploy the CI system. For example, by knowing the shopping behavior for a particular consumer at a particular merchant, the CI system may make more refined calculations or place more nuanced visual emphasis on certain items available from other merchants of the same or similar type using the CI system for that consumer. For example, the CI system may use a particular consumer's shopping habits at the store GAP as a proxy to determine what items to visually emphasize when the consumer shops at other casual fashion retailers. As a consumer interacts with the CI system at more merchants, the CI system may improves its ability to weight the relative importance of social associates and consumer preferences in the context of particular types of merchants. With more use, the CI system may have more data to populate item details data 302 that can be used to intelligently improve how scores for attributes and items are weighted, thereby generating vectors that can be used to more accurately assess which items to visually emphasize to the consumer.

Advantageously, the CI system may perform attribute-based matching where insights about a consumer's desired attributes for one type of item (e.g., shirt) may be used to control how and what other types of items (e.g., pants) are displayed to the consumer based on attribute similarity. This may be preferable to conventional systems, that only consider what products are purchased together (e.g., beer and diapers), without considering attributes of those products.

The CI system also advantageously analyzes and presents choices on multiple dimensions; and uses visual cues such as size, opacity (brightness), screen position to simplify data. The CI system may present more choices on a single webpage so consumers can intuitively compare and select items more quickly. Visually presenting information in this manner permits brands (e.g., merchants) to personalize the way they present choice to consumers, replicate physical merchandising online, and aid discovery to drive sales. This is a major departure from linear systems search listings, recommendation engines, grids of products found virtually ecommerce systems and grids of TV listings. It also dispenses with the need for rigid menu systems.

The CI system is also better than existing search engines. Search engines react to queries, whereas CI is proactive. Search engines list results in pages (usually no more than 20 items per page), but do not distinguish choices other than listing them in a certain order. Consumers have no idea the extent to which a particular item is better than other items in the list and the search engine does not share inclusion criteria. The CI system distinguishes each item on three dimensions—size, brightness and location. The variation in each element provides insights about its inclusion and the relative difference between the other images. The CI system places many items on a single page, thus making many choices available allowing consumers to more easily compare choices and reduces the number of clicks to traverse a list. Fewer clicks may mean better conversion and more sales.

The CI system is also better than recommendations. Recommendations narrow choices to a handful of items that an algorithm deems a person might like. Recommendations present choices in single list (usually with images), but does not distinguish options so consumers must still look at each item before making a decision. The premise of recommendation engines is less choice makes things easy. In reality, recommendations eliminate the vast majority of product and content options that a company has carefully curated as part of its collection. Recommendations further rely on statistically models applied to aggregate data and try to determine how much a particular consumer differs from statistical norms. If they are wrong, the person chooses none of the options and the company fails to sell something.

Contrary to recommendation engines, the CI system doesn't overly narrow choice. Instead, it presents options and distinguishes each option. Consumers can glance at a display screen to hone in on areas of interest. The CI system replicates in-store merchandizing in a digital world. The companies that deploy the CI system benefit from offering more choices to their customers rather than a fewer. The CI system allows companies to improve the way they match the customer interests with the items they offer. Moreover, the CI system combines human discovery and algorithms to rank choices for the individual based on his or her ecosystem of friends. Moreover, the CI system's one-screen navigation system displays and contextualizes choices. If the CI system's ranking is wrong, the consumer can still choose from a wide range of options to make their best choice. The CI system is better because it lets consumers find their best choice and, at worst, present enough items that consumers are likely to choose something. Again, more sales and better sales. People leave with what they want. This reduces returns and encourages repeat business.

The CI system is also better than grids. Grids, like TV listings found in print issues of magazines or a TV Guide, have been around since the 1950s. They sufficed in an era of limited choice. The amount of choice and the dimensionality of the selection criteria make grids almost useless. Still, listing grids are the standard for navigating content choices on cable systems with 100s of channel options or 1000s of on demand programming choices. And, because the programming, markup and coding languages like CSS and HTML are based on blocks, virtually every ecommerce site uses grids as the basis of product presentation. Grids limit creativity, eliminate ways companies can distinguish their brand, are a tedious system for consumers, and arguably may be the single most impactful reason for poor online conversion.

The CI system breaks the grid. The GUI 100 may not rely on CSS or HTML and instead may present items in ways that replicate physically merchandized products. This allows companies to be creative with online product and content presentation, incorporate their brand in the shopping process and increase conversion to drive sales.

Figure 12:
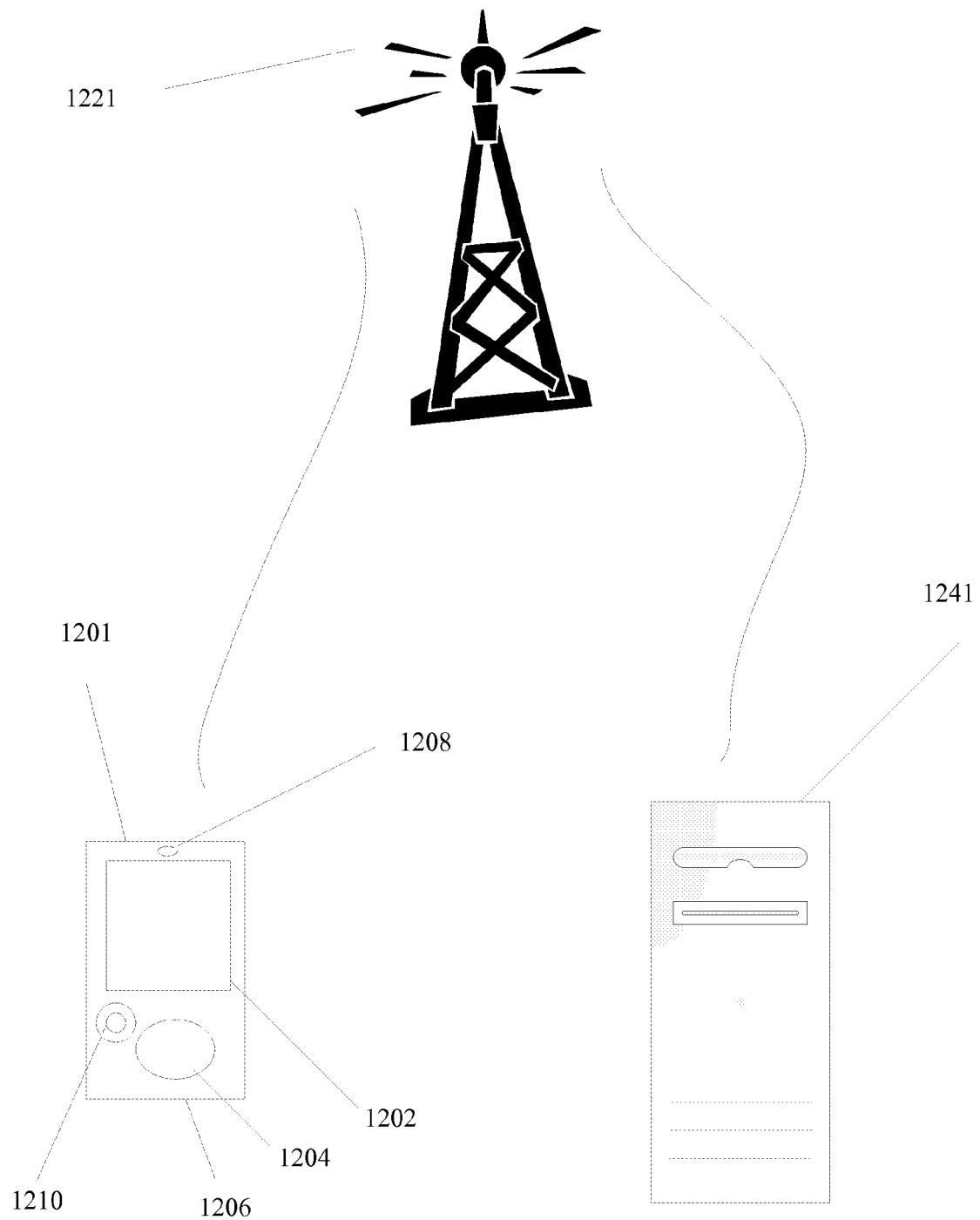
FIG. 12 may be a high level illustration of some of the elements of a sample computing system in accordance with example embodiments.
Figure 13:
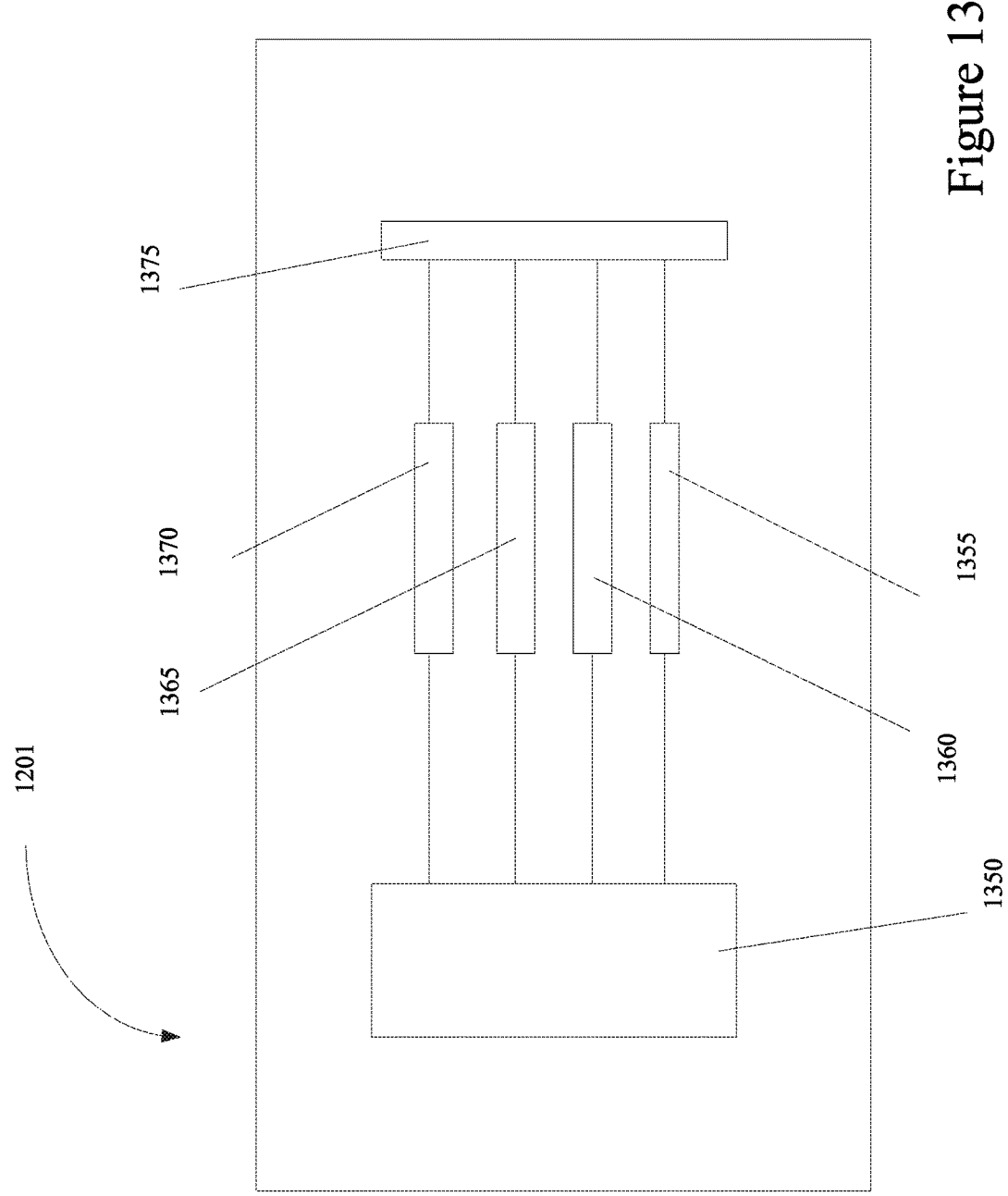
FIG. 13 illustrates a user device in accordance with example embodiments.

FIG. 12 may be a high level illustration of some of the elements of a sample computing system in accordance with example embodiments. The computing system may be a server 1241, a user computing device 1201, an application on the server 1241, an application on the user device 1201 or a combination of all of these. FIG. 13 may be a high level illustration of a user device 1201 communicating with a server 1241 but the application may be stored and accessed in a variety of ways. In addition, the application may be obtained in a variety of ways such as from an app store, from a web site, from a store Wi-Fi system, etc. There may be various versions of the application to take advantage of the benefits of different computing devices, different languages and different API platforms.

In one embodiment, a user device 1201 may be a device that operates using a portable power source 1355 such as a battery. The user device 1201 may also have a display 1202 which may or may not be a touch sensitive display. More specifically, the display 1202 may have a capacitance sensor, for example, that may be used to provide input data to the user device 1201. In other embodiments, an input pad 1204 such as arrows, scroll wheels, keyboards, etc., may be used to provide inputs to the user device 1201. In addition, the user device 1201 may have a microphone 1206 which may accept and store verbal data, a camera 1208 to accept images and a speaker 1210 to communicate sounds.

The user device 1201 may be able to communicate with a computing device 1241 or a plurality of computing devices 1241 that make up a cloud of computing devices 1211. The user device 1201 may be able to communicate in a variety of ways. In some embodiments, the communication may be wired such as through an Ethernet cable, a USB cable or RJ6 cable. In other embodiments, the communication may be wireless such as through Wi-Fi (802.11 standard), Bluetooth, cellular communication or near field communication devices. The communication may be direct to the server 1241 or may be through a communication network 1221 such as cellular service, through the Internet, through a private network, through Bluetooth, etc. FIG. 13 may be a simplified illustration of the physical elements that make up a user device 1201 and FIG. 14 may be a simplified illustration of the physical elements that make up a server 1241.

FIG. 13 illustrates a user device 1201 in accordance with example embodiments. The user device 1201 may have a processor 1360 that is physically configured according to computer executable instructions. It may have a portable power supply 1355 such as a battery which may be rechargeable. It may also have a sound and video module 1360 which assists in displaying video and sound and may turn off when not in use to conserve power and battery life. The user device 1201 may also have volatile memory 1365 and non-volatile memory 1370. There also may be an input/output bus 1375 that shuttles data to and from the various user input devices such as the microphone 1306, the camera 1308 and other inputs 1302, etc. It also may control of communicating with the networks, either through wireless or wired devices. Of course, this is just one embodiment of the user device 1201 and the number and types of user device 1201 is limited only by the imagination.

Figure 14:
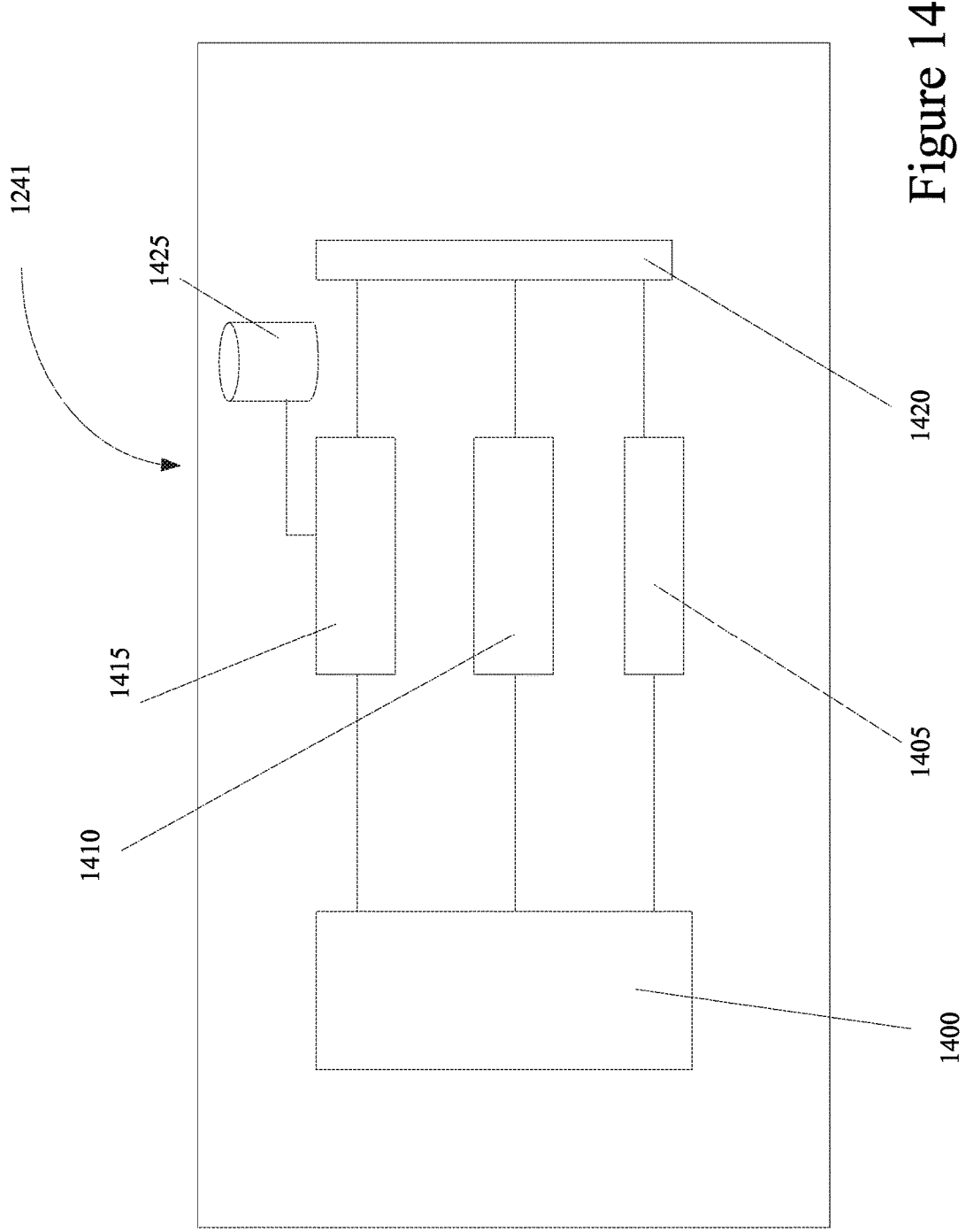
FIG. 14 illustrates a server in accordance with example embodiments.

The physical elements that make up the server 1241 may be further illustrated in FIG. 14. At a high level, the server 1241 may include a digital storage such as a magnetic disk, an optical disk, flash storage, non-volatile storage, etc. Structured data may be stored in the digital storage such as in a database. The server 1241 may have a processor 1400 that is physically configured according to computer executable instructions. It may also have a sound and video module 1405 which assists in displaying video and sound and may turn off when not in use to conserve power and battery life. The server 1241 may also have volatile memory 1410 and non-volatile memory 1415.

The database 1425 may be stored in the memory 1410 or 1415 or may be separate. The database 1425 may also be part of a cloud of server 1241 and may be stored in a distributed manner across a plurality of servers 1241. There also may be an input/output bus 1420 that shuttles data to and from the various user input devices such as the microphone 1406, the camera 1408, the inputs 1402, etc. The input/output bus 1420 also may control of communicating with the networks, either through wireless or wired devices. In some embodiments, the application may be on the user device 1201 and in other embodiments, the application may be remote. Of course, this is just one embodiment of the server 1241 and the number and types of user device 1201 is limited only by the imagination.

Figure 15:
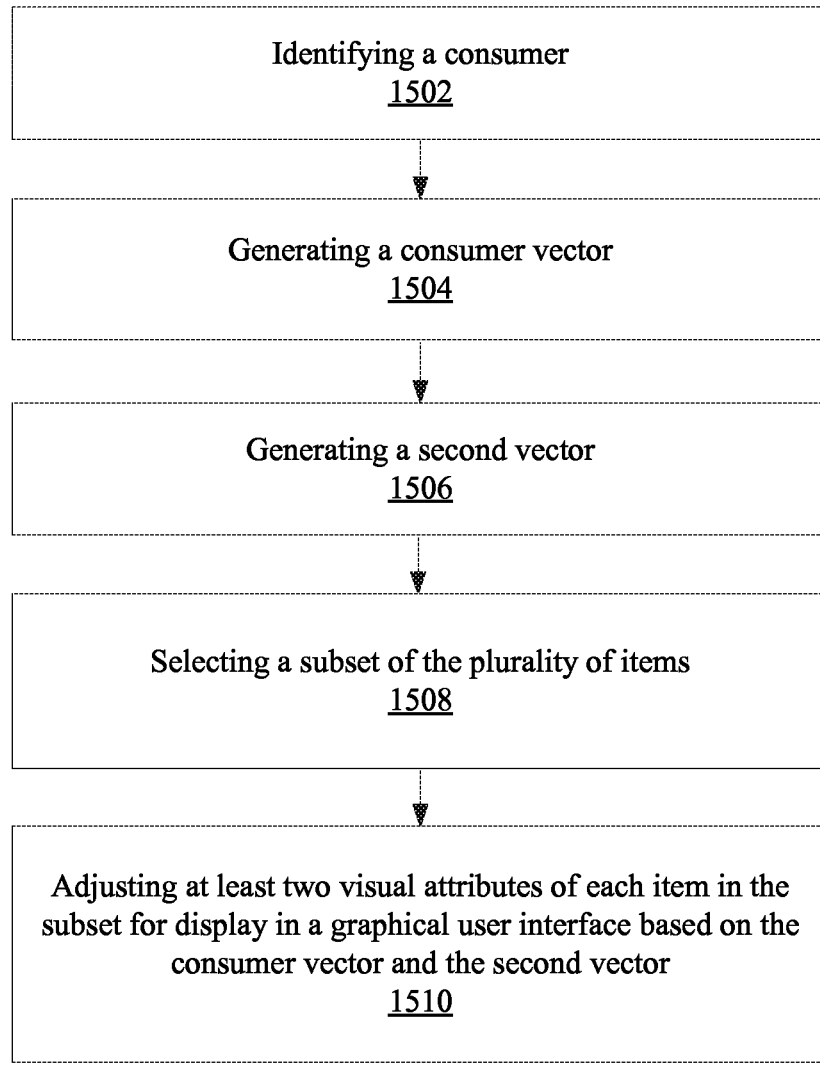
FIG. 15 illustrates a flow diagram in accordance with example embodiments.

FIG. 15 illustrates an example flow diagram of a method in accordance with example embodiments. The flow diagram may be implemented by a system or apparatus, such as, for example, server 1241. Each of the steps shown in the flow diagram may be repeated one or times, one or more of the steps may be modified, and one or more of the steps may be omitted. The method may be stored on a non-transitory computer readable medium as computer executable instructions. The computer executable instructions, when executed by at least one processor, may cause at least one computer or other device to perform the method one or more times. The flow diagram may begin at block 1502.

In block 1502, the method may include identifying a consumer. In block 1504, the method may include generating a consumer vector for a plurality items, wherein the consumer vector comprises a consumer interest score for each of the items. In block 1506, the method may include generating a second vector. In an example, the second vector may be a social vector comprising a social associate interest score for each of the items. In another example, the second vector may be a promotion vector. In block 1508, the method may include selecting a subset of the plurality of items. In block 1510, the method may include adjusting at least two visual attributes of each item in the subset for display in a graphical user interface based on the consumer vector and the second vector. The method may end, may return to one or more preceding steps, may repeat one or more times, and combinations thereof.

The user devices, computers and servers described herein may be general purpose computers that may have, among other elements, a microprocessor (such as from the Intel Corporation, AMD or Motorola); volatile and non-volatile memory; one or more mass storage devices (i.e., a hard drive); various user input devices, such as a mouse, a keyboard, or a microphone; and a video display system. The user devices, computers and servers described herein may be running on any one of many operating systems including, but not limited to WINDOWS, UNIX, LINUX, MAC OS, or Windows (XP, VISTA, etc.). It is contemplated, however, that any suitable operating system may be used for the present invention. The servers may be a cluster of web servers, which may each be LINUX based and supported by a load balancer that decides which of the cluster of web servers should process a request based upon the current request-load of the available server(s).

The user devices, computers and servers described herein may communicate via networks, including the Internet, WAN, LAN, Wi-Fi, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described Figures, including any servers, user devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a harddrive or a floppy disk, or an optical medium such as a CD-ROM. Any such computer readable medium may reside on or within a single computational apparatus and may be present on or within different computational apparatuses within a system or network.

It may be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one of the inventions to the embodiments illustrated.

The present disclosure provides a solution to the long-felt need described above. In particular, the systems and methods described herein may be configured for improving visual display. Further advantages and modifications of the above described system and method will readily occur to those skilled in the art. The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure covers all such modifications and variations provided they come within the scope of the following claims and their equivalents.

What is claimed:

1. A computer-implemented method comprising:
identifying a consumer associated with a device;
generating, by at least one processor, a consumer vector comprising a consumer interest score for each of a plurality of items;
generating, by the at least one processor, a second vector;
selecting a subset of the plurality of items; and
adjusting, by the at least one processor, at least two visual attributes of each item in the subset for display in a graphical user interface based on the consumer vector and the second vector.

2. The method of claim 1, further comprising:
identifying at least one social associate having a relationship with the consumer on a social network; and
generating a social vector comprising a social associate interest score for each of the items, wherein the second vector is the social vector.

3. The method of claim 2, wherein a first of the at least two visual attributes is opacity, the method further comprising applying at least one of an arithmetic or logarithmic scale to control opacity of each item in the subset based on the social vector.

4. The method of claim 2, further comprising determining a z-score based on conversion data and view data associated with the at least one social associate, wherein the social associate interest score is based on the z-score.

5. The method of claim 1, wherein the at least two visual attributes comprise at least two of location, size, and opacity.

6. The method of claim 1, wherein the adjusting of at least two visual attributes comprises adjusting a size of each item in the subset based on the consumer vector, adjusting an opacity of each item in the subset based on the second vector, and adjusting a location of each item in the subset based on a promotion vector.

7. The method of claim 1, further comprising determining a z-score based on conversion data and view data associated with the consumer, wherein the consumer interest score is based on the z-score.

8. The method of claim 1, further comprising determining a plurality of common attributes based on items previously purchased by the consumer, wherein the consumer interest score is based on similarity of attributes of each item in the subset to the common attributes.

9. The method of claim 1, wherein the selecting a subset of the plurality of items is based on a size of a display screen of the device.

10. A non-transitory computer readable medium storing computer readable instructions that, when executed by at least one processor, cause an apparatus at least to perform:
    identifying a consumer associated with a device;
    generating a consumer vector comprising a consumer interest score for each of a plurality of items;
    generating a second vector;
    selecting a subset of the plurality of items; and
    adjusting at least two visual attributes of each item in the subset for display in a graphical user interface based on the consumer vector and the second vector.

11. The computer readable medium of claim 10, wherein the instructions, when executed, further cause the apparatus perform:
    identifying at least one social associate having a relationship with the consumer on a social network; and
    generating a social vector comprising a social associate interest score for each of the items, wherein the second vector is the social vector.

12. The computer readable medium of claim 11, wherein a first of the at least two visual attributes is opacity, the method further comprising applying at least one of an arithmetic or logarithmic scale to control opacity of each item in the subset based on the social vector.

13. The computer readable medium of claim 10, wherein the instructions, when executed, further cause the apparatus perform determining a z-score based on conversion data and view data associated with the at least one social associate, wherein the social associate interest score is based on the z-score.

14. The computer readable medium of claim 10, wherein the at least two visual attributes comprise at least two of location, size, and opacity.

15. The computer readable medium of claim 10, wherein the adjusting of at least two visual attributes comprises adjusting a size of each item in the subset based on the consumer vector, adjusting an opacity of each item in the subset based on the second vector, and adjusting a location of each item in the subset based on a promotion vector.

16. The computer readable medium of claim 10, wherein the instructions, when executed, further cause the apparatus perform determining a z-score based on conversion data and view data associated with the consumer, wherein the consumer interest score is based on the z-score.

17. The computer readable medium of claim 10, wherein the instructions, when executed, further cause the apparatus perform determining a plurality of common attributes based on items previously purchased by the consumer, wherein the consumer interest score is based on similarity of attributes of each item in the subset to the common attributes.

18. The computer readable medium of claim 10, wherein the selecting a subset of the plurality of items is based on a size of a display screen of the device.

19. An apparatus comprising:
    at least one processor; and
    a memory storing computer readable instructions that, when executed by the at least one processor, cause the apparatus at least to perform:
        identifying a consumer associated with a device;
        generating a consumer vector comprising a consumer interest score for each of a plurality of items;
        generating a second vector;
        selecting a subset of the plurality of items; and
        adjusting at least two visual attributes of each item in the subset for display in a graphical user interface based on the consumer vector and the second vector.

20. The apparatus of claim 19, wherein the adjusting of at least two visual attributes comprises adjusting a size of each item in the subset based on the consumer vector, adjusting an opacity of each item in the subset based on the second vector, and adjusting a location of each item in the subset based on a promotion vector.

* * * * *